Nov. 2, 1948.   F. T. BLAYDES   2,452,829
TRACTOR ATTACHING STRUCTURE FOR IMPLEMENTS
Filed Sept. 19, 1947

Inventor
Frederick T. Blaydes
By Paul O. Pippel
Atty

Patented Nov. 2, 1948

2,452,829

UNITED STATES PATENT OFFICE 2,452,829

TRACTOR ATTACHING STRUCTURE FOR IMPLEMENTS

Frederick T. Blaydes, Canton, Ill., assignor to International Harvester Company, a corporation of New Jersey Application September 19, 1947, Serial No. 775,105

3 Claims. (Cl. 280—33.44)

This invention relates to agricultural implements. More specifically the invention relates to an attaching structure by which an implement is connected to a tractor.

In the agricultural implement industry it is customary to mount implements upon tractors and the like having laterally spaced wheels journaled upon axles carried in rigid housings. Since the drive wheels are located at the rear of the tractor, this rear axle housing serves for the attachment of implements to the vehicle. Inasmuch as the implement must be maintained in a certain position with respect to the tractor, and, when directly connected thereto must be raised thereupon for transport purposes, adequate provision must be made for firmly securing the attaching structure to the rear axle housing of the tractor to provide against angular displacement with respect thereto.

An object of the present invention is to provide an improved attaching structure for connecting an agricultural implement or the like to a tractor.

Another object of the invention is to provide a quick attachable connection for securing an agricultural implement to the rear axle housing of a tractor which likewise provides for firmly securing and quickly detaching the implement from the tractor.

Since the rear axle housings of tractors are made by the casting process, variations frequently occur in the size of the rear axle housing, and it is important in providing a connection for an implement to a tractor that the attaching structure be able to accommodate itself to the variations in size of axle housing that may be found upon different tractors. Therefore, another object of the present invention is to provide an attaching structure for connecting an implement to the rear axle housing of a tractor wherein provision is made for providing a firm connection irrespective of minor variations in size of the housing.

Figure 1:
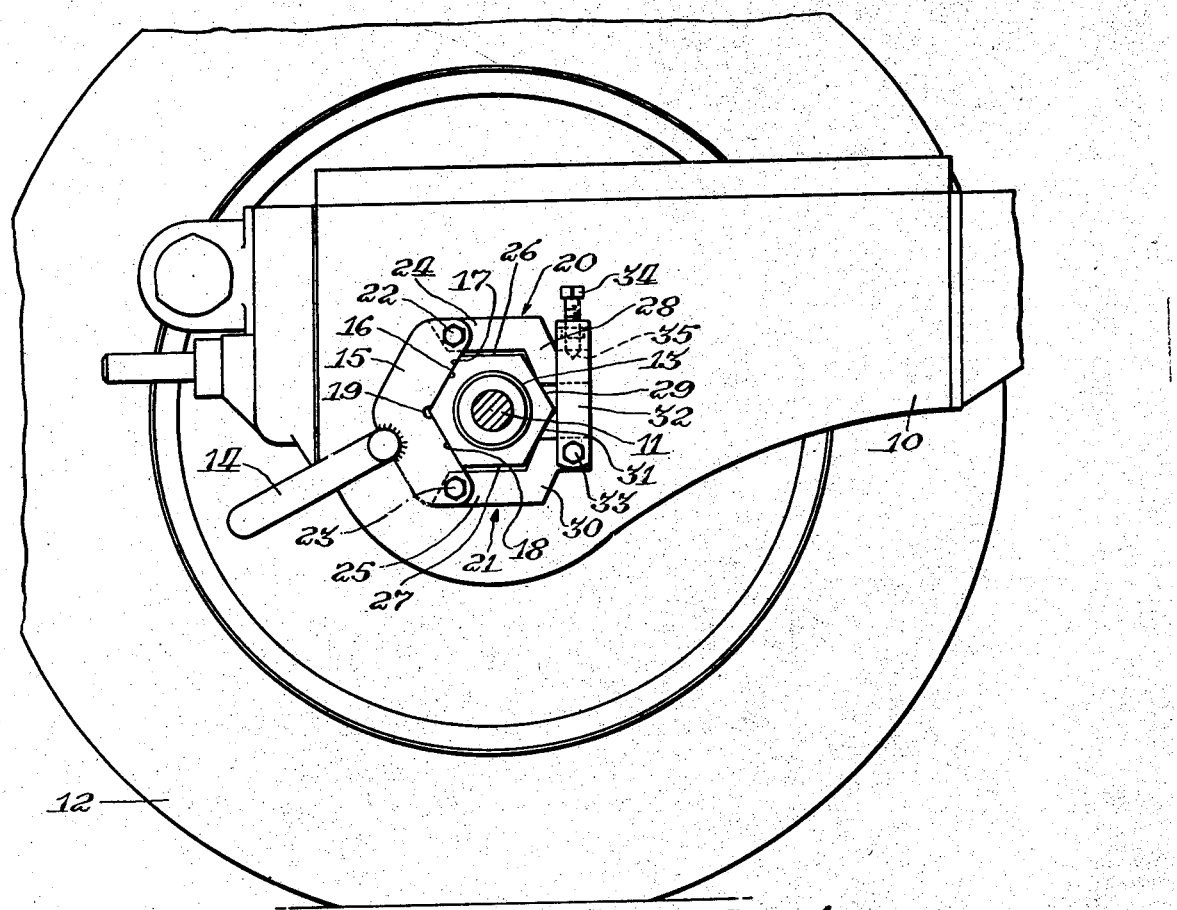
Figure 2:
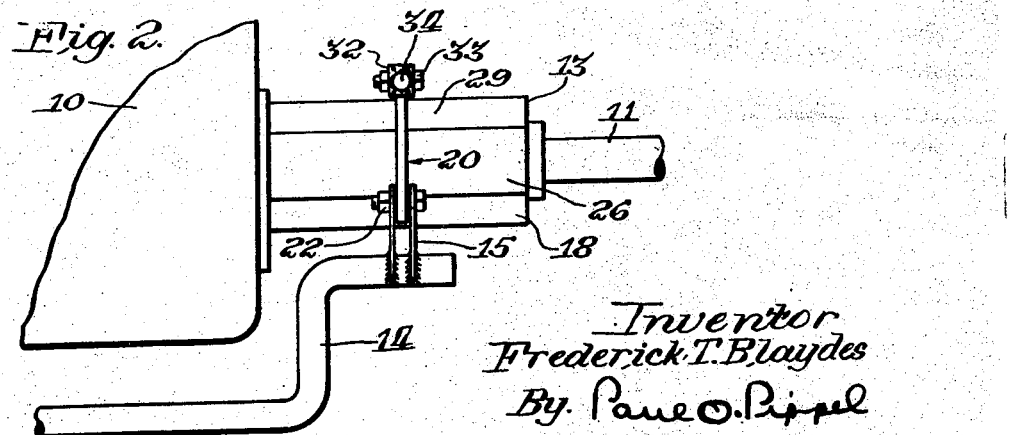

Other objects and advantages of the invention will become clear from the following detailed description when read in conjunction with the accompanying drawings, wherein:

Figure 1 is a view in elevation of the rear end of a tractor, showing one wheel removed and illustrating the features of the present invention; and Figure 2 is a plan view of a portion of the structure shown in Figure 1.

In the drawings, it will be noted that the numeral 10 designates the longitudinally extending body of a tractor having a transversely extending rear axle 11 upon which are mounted laterally spaced drive wheels 12, only one of which is shown. Axle 11 is journaled in a housing 13. It may be observed that the rear axle structure or housing 13 is hexagonal in shape.

The rear axle structure 13 extends laterally from each side of the body 10, although only one side thereof is shown, and each of these axle housings serves for the mounting upon the tractor of an agricultural implement. Although the earth-working tools of an agricultural implement are not shown in the drawings, it may be understood that they are mounted upon a tool supporting bar 14, one end of which is welded to a supporting member 15. Member 15 is triangular in shape and one side thereof is in the form of a V-notch 16 adapted to engage and to conform to the angle made by adjacent faces 17 and 18 of the rear axle housing 13. It may be noted that the apex of the V-notch 16 is provided with a cut-out portion 19 adapted to receive the apex of the angle formed by the sides 17 and 18 of the axle housing.

Supporting member 15 forms a part of a clamping structure by which the implement is connected to the tractor and includes a pair of links 20 and 21 which are pivotally connected at 22 and 23, respectively, to the triangular member 15. Members 20 and 21 comprise longitudinally extending portions 24 and 25 which are generally parallel to the upper and lower faces 26 and 27, respectively, of the axle housing 13 and to each other. It will also be noted that the portions 24 and 25 are spaced from the respective axle housing sides for a purpose which will hereinafter become clear.

Each of the links 20 and 21 is bent at an angle to generally conform to adjacent faces of the hexagonal axle housing 13. For example, link 20 is provided with a portion 28 at an angle with respect to the horizontal portion 24 thereof which corresponds generally to the angle made by the upper face 26 of axle housing 13 with respect to the face 29 thereof. However, as will be observed from a study of Figure 1, the angle made by the bent portion 28 with respect to the horizontal portion 24 of the link 20 is smaller than that formed by the faces 26 and 29 of the housing. This causes the end of the bent portion 28, which is shorter than the length of the housing face 29, to engage the latter and leave a wedge-shaped space therebetween.

The link 21 is similarly constructed and is bent to form an angle portion 30 which forms with the horizontal portion 25 thereof an angle less than that formed by the faces 27 and 31 of the axle housing. Due to the spacing between the links 20 and 21 and the axle housing, provision is made for the attaching structure to be utilized upon axle housings varying in size.

The attaching structure of the present invention is maintained against angular displacement with respect to the axle housing 29 by means of a latching device comprising a U-shaped link 32, the free ends of which are pivoted at 33 upon the end of link 21 and the bight portion thereof is provided with a threaded opening adapted to receive a screw 34 therein. Screw 34 is conically shaped at its end for seating in a conical depression 35 formed in the bent end of upper link 20. Advancing the screw 34 in the opening provided therefor in the U-shaped member 32, of course, draws the links 20 and 21 together and firmly secures the attaching structure to the housing of the tractor. Dismounting of the implement from the tractor is quickly accomplished by simply withdrawing the screw 34 from its seat 35 in the upper link 20 and swinging the link 32 downwardly about its pivot. The attaching structure is then readily withdrawn from the rear axle housing. The length and shape of the housing 13 facilitate adjustment of the clamp laterally. This is frequently necessary for the proper positioning of the earth-working tools carried by the bar 14 with respect to the tractor, and is accomplished simply by releasing the latch and sliding the clamp structure axially along the housing.

It is believed that the function and operation of the attaching structure of the present invention will be clearly understood from the foregoing description. It should be understood that modifications may be made in the invention without departing from the spirit thereof. Therefore it is desired that the invention be limited only by the scope of the appended claims.

What is claimed is:

1. In an agricultural implement including a tractor having a rear axle housing, said rear axle housing being hexagonal in section, an implement attaching bracket comprising a triangular member having adjacent faces forming a V-notch engaging adjacent faces of said hexagonal housing, links pivotally connected to the ends of said member and swingable to positions substantially paralleling respective opposite faces of said axle, each of said links being bent inwardly at an angle to conform generally to the angle made by adjacent faces of said axle housing but at a smaller angle, whereby the inwardly bent ends only of said links engage respective adjacent faces of said housing opposite said member, a latch member pivoted on the end of one said link, and adjustable means for securing said latch member to the other said link.

2. In combination, a tractor having an axle, a housing hexagonal in section for said axle, implement attaching means including separable parts surrounding said axle housing and adapted to be secured thereto against relative angular movement, said attaching means comprising a triangular member having adjacent faces engaging adjacent faces of said hexagonal housing, links pivoted to the ends of said member engageable with opposite faces of the housing, each said link being bent to form a smaller angle than that made by the adjacent sides of the housing opposite said triangular member, whereby only the ends of the bent portions of said links engage the respective sides of said housing, and releasable means for drawing together the ends of said links.

3. In combination, a tractor having an axle, a housing hexagonal in section surrounding said axle, implement attaching means adapted to be secured to said housing and held against relative angular movement including an implement support angularly shaped to conform to the angle made by adjacent faces of said hexagonal housing, clamping elements extending from said support generally parallel to and spaced from opposite faces of said housing, said clamping elements partly surrounding said housing and shaped to conform to the angles made by the other faces of said housing, the ends of said elements being bent inwardly at an angle smaller than that made by adjacent faces of the housing, whereby only the ends of said elements engage the respective faces and said implement attaching means may be applied to housings of different size, and adjustable means connecting the free ends of said elements for tightening and securing said implement attaching means upon said housing.

FREDERICK T. BLAYDES.

No references cited.